United States Patent [19]

Okude

[11] Patent Number: 5,505,546
[45] Date of Patent: Apr. 9, 1996

[54] SPLIT BEARING AND SPLIT BUSHING MADE OF ENGINEERING PLASTICS

[75] Inventor: Masashi Okude, Tokyo, Japan

[73] Assignee: Kabushiki Kaisha Sansho, Tokyo, Japan

[21] Appl. No.: 327,599

[22] Filed: Oct. 21, 1994

[30] Foreign Application Priority Data

Oct. 29, 1993 [JP] Japan .................................. 5-294699

[51] Int. Cl.$^6$ .......................... F16C 35/02; F16C 33/02
[52] U.S. Cl. ............................................ 384/428; 384/276
[58] Field of Search .................................. 384/428, 434, 384/438, 276, 295

[56] References Cited

U.S. PATENT DOCUMENTS

| | | | |
|---|---|---|---|
| 610,130 | 8/1898 | Farmer | 384/428 |
| 2,354,996 | 8/1944 | Jadach | 384/428 X |
| 3,770,109 | 11/1973 | Kraft | 384/428 X |
| 3,820,860 | 6/1974 | Stone | 384/428 |
| 4,640,631 | 2/1987 | Belanger | 384/428 X |

*Primary Examiner*—Thomas R. Hannon
*Attorney, Agent, or Firm*—Flynn, Thiel, Boutell & Tanis

[57] ABSTRACT

A bearing and a bushing each made of engineering plastics which are materials particularly excellent in chemical durability (e.g., chemical resistance) and each having split structure to remarkably facilitate the attachment or exchange of them. The split bearing is composed of two bearing halves which are joined together to face each other, each bearing half having a substantially box-shaped half bearing main portion with a recess of a half bearing hole on the upper surface thereof and forming thereon a space which is symmetrical to the half bearing main portion with regard to the center of the half bearing hole, the each bearing half also having half mounting plate portions which are half of the half bearing main portion in thickness and extend to the left and right thereof, and which have half mounting holes arranged at left and right positions bisymmetrical to each other relative to the center set forth above, each half mounting hole being a half of each mounting hole in length, and each half mounting plate portion has an engaging projection on the upper internal side thereof and an engaging recess on the lower internal side thereof, the projection and recess being in shape anti-symmetrical to each other. The split bushing is composed of a pair of bushing halves of semi-cylindrical body, each provided with a ridge and a groove on contact surfaces thereof thereby to be joined together. Therefore, the engineering plastics effect excellent durability and the split structure effects very easy attachment or exchange of them.

6 Claims, 9 Drawing Sheets

FIG. 1(b)
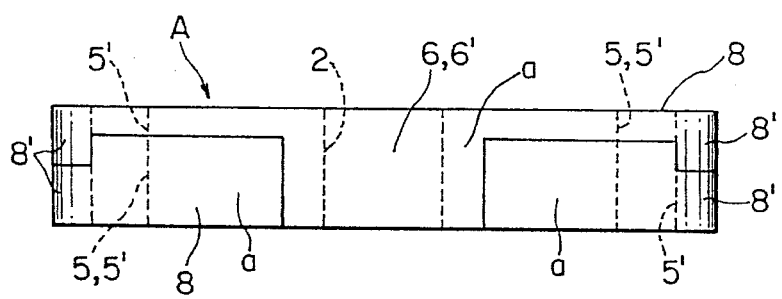
FIG. 1(a)
FIG. 1(d)
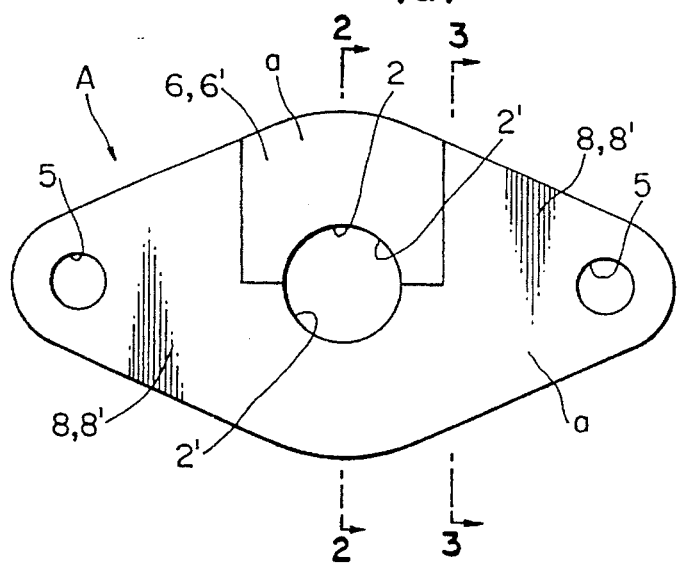
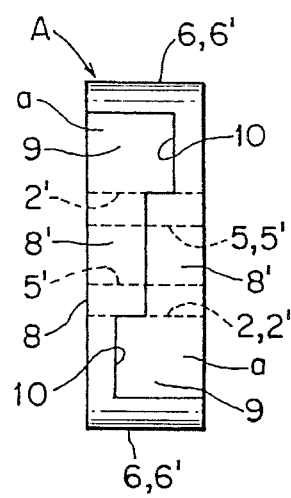
FIG. 1(c)
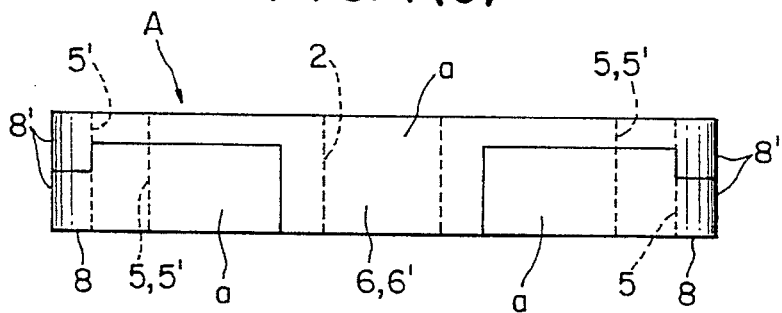

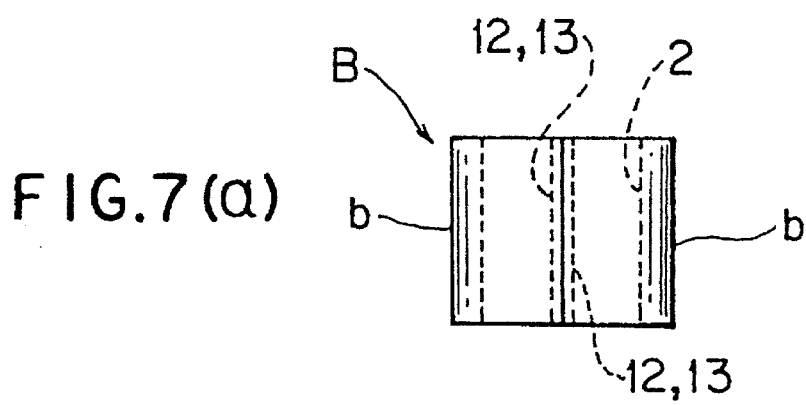
FIG.7(a)
FIG.7(b)
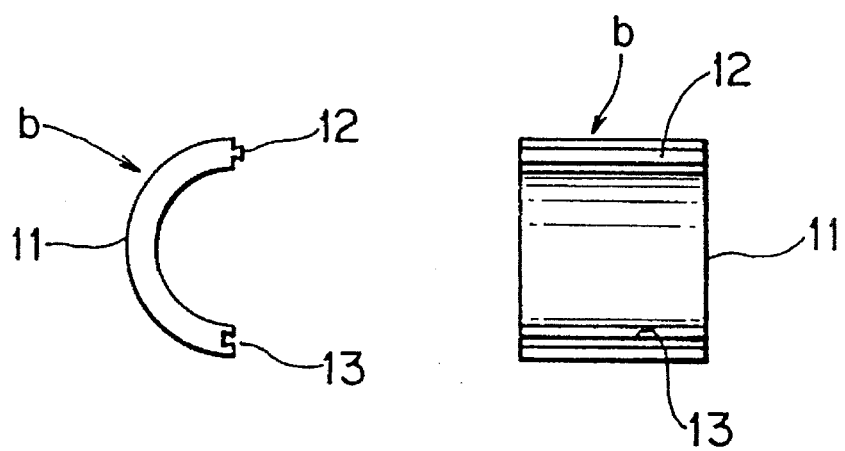
FIG.8(a)  FIG.8(b)

SPLIT BEARING AND SPLIT BUSHING MADE OF ENGINEERING PLASTICS

BACKGROUND OF THE INVENTION

1. Field of the Invention

The present invention relates to a structure of a bearing for rotatably supporting a shaft (rotating shaft, i.e., driving shaft, transmission shaft etc.) of a mechanical device used in various chemical works, food works etc., for example, a plating works, and a structure of a bushing for rotatably supporting the shaft, the bushing being fit in a bearing hole at need, and aims to provide a split bearing and a split bushing characterized in being made of engineering plastics which is a material particularly excellent in chemical characteristic (e.g., chemical resistance) as well as in mechanical and physical characteristics, the bearing and bushing each having split structure to remarkably facilitate the attachment and exchange of the same.

2. Description of the Related Art

Various mechanical devices used in various kinds of chemical works, food processing works etc. naturally comprise shafts (rotating shafts, i.e., driving shafts, transmission shafts etc.) incorporated therein as a power transmission means, each shaft having gears, pulleys etc. directly fixed thereto and being rotatably supported by way of bearings at some portions thereof. Steel-ball bearings (referred to simply as bearings hereinafter in this section) are mainly used in the works set forth above.

In the above works, e.g., a plating works, various chemical liquids are used in a mechanical device, so that the shafts, bearings, gears, pulleys etc. are always wet being bathed in chemical liquids. As a result, the bearings and other metal components rust and corrode in a very short period of time to cause a trouble in the rotation of shafts and consequently the operation of the whole device, so that the bearings etc. have to be frequently periodically (e.g. every month) exchanged with new ones.

Whereas taking for example exchanging a bearing alone, since a shaft is inserted thereinto, it requires detaching the shaft from the mechanical device and further taking off the bearing, gears, pulleys etc. from the shaft to which they are attached. However, bolts, screws etc. which fix them to the shaft are liable to corrode and rust, and some bolts even have lost their bolt heads to which tools are applied, so that often they have to be inevitably broken to pieces in order to detach them from the shaft since they cannot be detached therefrom easily as they are, which requires considerable dexterity, time and cost.

Particularly in case of the bearings, steel balls therein are liable to be fastened to the shaft with rust due to corrosion. Although the external rail portion thereof and the balls can be detached from the shaft by breaking them into pieces, the internal rail portion thereof directly fixed to the shaft often has to be burnt off by a cutting torch to detach the same from the shaft since shattering them with a hammer etc. is likely to damage the shaft itself, but it requires a considerable dexterity and time in order to prevent the shaft from overheating as well as from being damaged.

Difficult situations in exchanging bearings as set forth above are the same not only in plating works but in other works such as various chemical works, food processing works etc. where the bearings are used in a manner of exposing them to corrosion.

On the other hand, adding to the recent lack of man power, it is a dirty work in a dirty site, and moreover clients complain of a long time consumed, inefficiency and a high wage for a simple exchange of bearing though actually it requires dexterity more than it appears. As a result, servicemen has been decreased in number to largely delay repair on request, and furthermore mechanical devices have to be stopped for a long time for exchange operation, so that the manufacturers have had a very hard time of it.

Although bearings of other familiar plastics such as vinyl chloride etc. have been studied but have not caught much attention since the same construction requires the same trouble of detaching the shaft from the mechanical device and further detaching the gears, pulleys etc. in the same way as the prior art at the time of attachment or exchange of the bearings.

However, recently rapid progress has been made in the research and development of various plastics which are excellent in mechanical, physical and chemical performance for various precision machines and parts and have stable and high reliability free from degradation for a long time of period, i.e., engineering plastics to provide those having mechanical strength, physical characteristics (lubricity, abrasion resistance etc.), chemical characteristics such as chemical resistance (strong acid resistance, strong alkali resistance etc.) and the like which can be used as a bearing for a shaft used in the above various chemical works, food processing works etc. The present invention has been made having an eye on the above progress.

SUMMARY OF THE INVENTION

It is a first object of the present invention to provide a split bearing characterized in using engineering plastics having characteristic suited for a material of a bearing (integral structure without using ball-bearings) such as chemical resistance etc. as well as in having split structure to remarkably facilitate attaching the bearing to a shaft and detaching the same therefrom.

It is a second object of the present invention to provide a split bushing made of engineering plastics to be fit to the bearing hole portion which most requires durability in strength, structure etc. while making other portions, which do not require abrasion resistance etc. so long as it is excellent, e.g., in chemical resistance, of cheap plastics taking into consideration that the split bearing costs high if the whole bearing body is made of the engineering plastics which are very expensive compared with familiar plastics, the bushing having a split structure similar to the split bearing to remarkably facilitate the attachment and detachment thereof.

That is, the split bearing according to the present invention is made of engineering plastics and is provided with a bearing hole at the central portion thereof for rotatably supporting a shaft inserted therethrough in the front-to-back direction and mounting holes arranged at left and right positions bisymmetrical to each other relative to the bearing hole in a mounting plate for inserting bolts therethrough to mount the bearing on a frame etc., the split bearing being composed of two bearing halves which are joined together into one piece to face each other, each bearing half having a substantially box-shaped half bearing main portion which comprises a recess of a half bearing hole on the upper surface thereof, the half bearing hole being a half of the bearing hole split in the axial direction thereof, and forming thereon a space which is the same in shape and size as the half bearing main portion and is symmetrical thereto relative to the center of the half bearing hole, the each bearing half also having left and right half mounting plate portions which are half of the half bearing main portion in thickness and extend to the left and right of the half bearing main portion, and which have half mounting holes arranged at left and right positions bisymmetrical to each other relative to the center of the bearing hole, each half mounting hole being a half of each mounting hole in length, and each half mounting hole having an engaging projection on the upper internal side thereof and an engaging recess on the lower internal side thereof, the engaging projection and engaging recess being in shape anti-symmetrical to each other.

One of the two bearing halves and the other bearing half which is turned about the center of the bearing hole by 180° are placed face to face to be joined together into one piece, the half bearing main portion and space of one bearing half fitting in the space and half bearing main portion of the other bearing half respectively and the projection and recess of each half mounting plate portion of one bearing half engaging the recess and projection of each half mounting plate portion of the other bearing half respectively to bring the half mounting plate portions into contact with each other at the internal surfaces thereof so as to constitute a split bearing comprising a bearing main portion formed of the half bearing main portions of the bearing halves, a bearing hole formed of the half bearing holes of the bearing halves, mounting plates each formed of the half mounting plate portions of the bearing halves and mounting holes each formed of the half mounting holes of the bearing halves. The bearing halves are formed of engineering plastics in a metal mold. This split bearing made of engineering plastics can solve the problem.

Moreover, a split bushing according to the present invention is composed of a pair of bushing halves each having a shape of a semicylindrical body, i.e., a half of a cylindrical body split in the axial direction thereof, the cylindrical body slightly larger in internal diameter than the diameter of the shaft forming a bearing hole therein, each semicylindrical body being provided with a ridge at one contact surface thereof and a groove at the other contact surface thereof so that the semicylindrical bodies are joined together to form the split bushing by engaging the ridge and groove of one semicylindrical body with the groove and ridge of the other respectively, so as to be fit in the bearing for rotatably supporting the shaft inserted therethrough. Each bushing half of the same dimension and shape is formed of engineering plastics in a metal mold. The split bushing made of engineering plastics can also solve the problem.

BRIEF DESCRIPTION OF THE DRAWINGS

FIG. 1(a) is a front view, FIG. 1(b) is a plan view, FIG. 1(c) is a bottom view and FIG. 1(d) is a right side view of a split bearing according to an embodiment of the present invention;

FIG. 7(a) shows a plan view of a split bushing according to the present invention;

FIG. 7(b) shows a front view of a split bushing according to the present invention;

FIG. 8(a) shows a front view of a bushing half in FIGS. 7(a) and 7(b);

FIG. 8(b) shows a right side view of a bushing half in FIGS. 7(a) and 7(b); and

FIGS. 11(a), 11(b), 11(c) and 11(d) show a split bearing having a flat octagonal shape according to a modified embodiment of the present invention, wherein FIGS. 11(a) and 11(c) are side views thereof and FIGS. 11(b) and 11(d) are front views thereof;

FIGS. 12(a), 12(b), 12(c) and 12(d) show a split bearing having a square shape according to another modified embodiment of the present invention, wherein FIGS. 12(a) and 12(c) are side views thereof and FIGS. 12(b) and 12(d) are front views thereof; and FIGS. 13(a), 13(b), 13(c) and 13(d) show a split bearing having a circular shape according to still another modified embodiment of the present invention, wherein FIGS. 13(a) and 13(c) are side views thereof and FIGS. 13(b) and 13(d) are front views thereof.

DESCRIPTION OF THE PREFERRED EMBODIMENT

Figure 2:
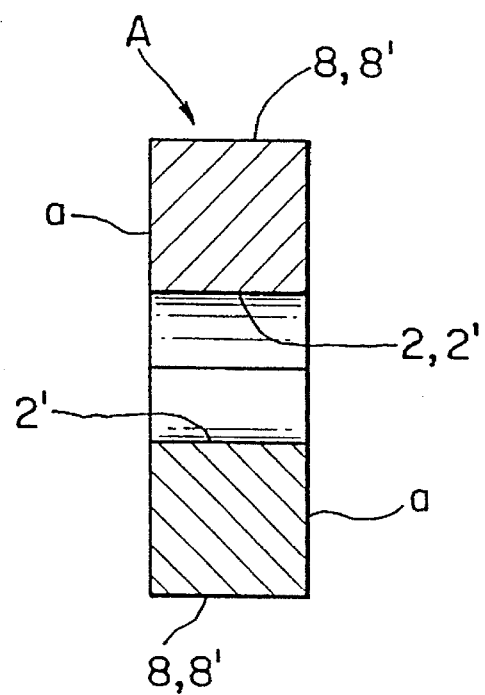
FIG. 2 is a cross-sectional view taken along a line 2—2 in FIG. 1(a)
Figure 3:
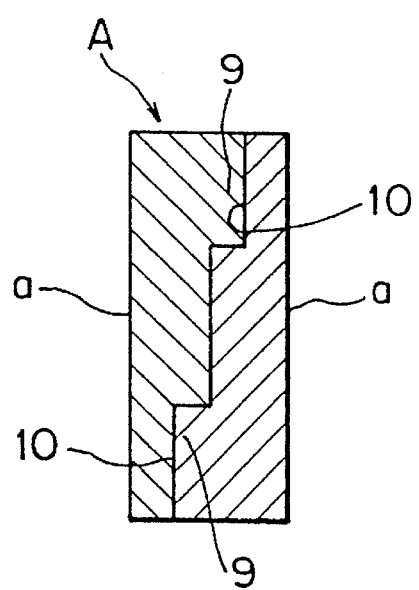
FIG. 3 is a cross-sectional view taken along a line 3—3 in FIG. 1(a)
Figure 4A:
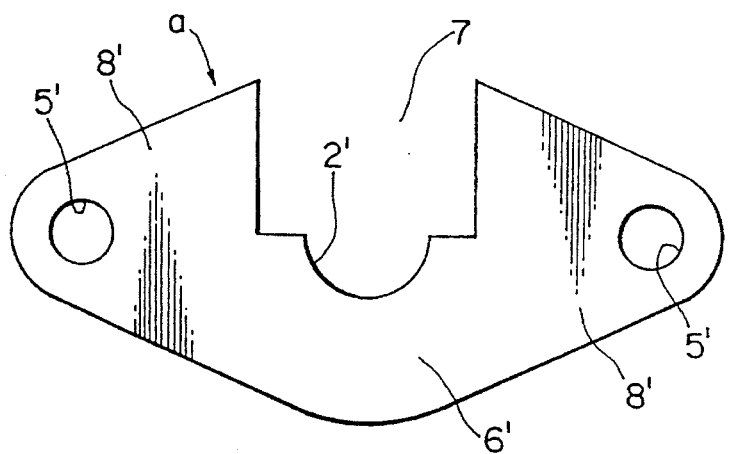
FIG. 4(a) is a front view.
Figure 4D:
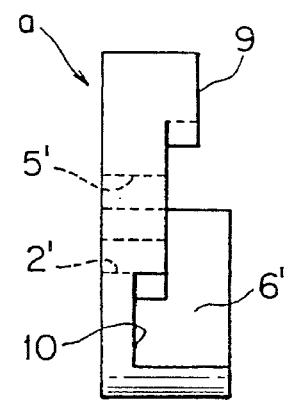
FIG. 4(c) is a rear view and FIG. 4(d) is a right side view of a bearing half according to the present invention.
Figure 4B:
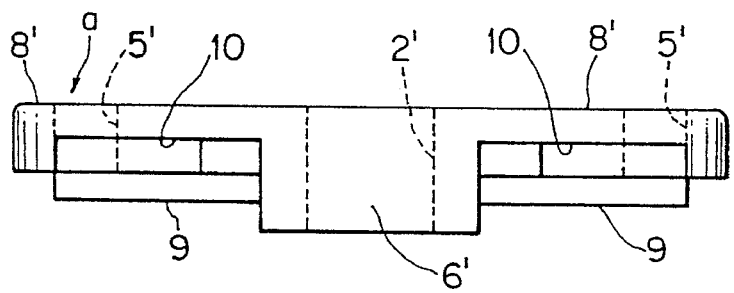
FIG. 4(b) is a bottom view.
Figure 4C:
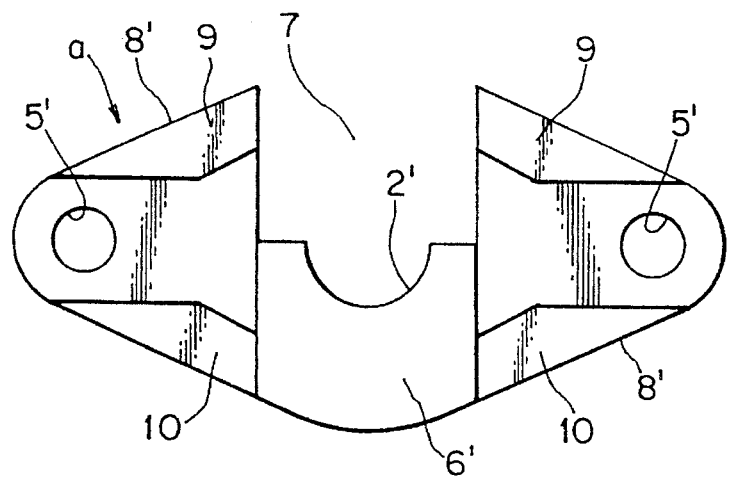

An Embodiment of a Split Bearing: FIGS. 1 to 6

A split bearing according to an embodiment of the present invention will be described hereinafter with reference to drawings (FIGS. 1 to 6). A split bearing A made of engineering plastics is provided with a bearing hole 2 at the central portion thereof for rotatably supporting a shaft 1 inserted therethrough in the front-to-back direction and mounting holes 5 arranged at left and right positions bisymmetrical to each other relative to the bearing hole 2 in a mounting plate 8 for inserting bolts 4 therethrough to mount the split bearing A on a frame 3 etc., the split bearing A being composed of two bearing halves a and a which are joined together into one piece to face each other, each bearing half a having a substantially box-shaped half bearing main portion 6' which comprises a recess of a half bearing hole 2' on the upper surface thereof, the half bearing hole 2' being a half of the bearing hole 2 split in the axial direction thereof, and forming thereon a space 7 which is the same in shape and size as the half bearing main portion 6' and is symmetrical thereto relative to the center of the half bearing hole 2', the each bearing half a also having half mounting plate portions 8' and 8' which are half of the half bearing main portion 6' in thickness and extend to the left and right of the half bearing main portion 6', and which have half mounting holes 5' arranged at left and right positions bisymmetrical to each other relative to the center of the bearing hole 2, each half mounting hole 5' being a half of a mounting hole 5 in length, and each half mounting plate portion 8' has an engaging projection 9 on the upper internal side thereof and an engaging recess 10 on the lower internal side thereof, the projection 9 and recess 10 being anti-symmetrical to each other.

One of the two bearing halves a and the other bearing half a which is turned about the center of the bearing hole 2 by 180° are placed face to face to be joined together into one piece, the half bearing main portion 6' and space 7 of one bearing half a fitting in the space 7 and half bearing main portion 6' of the other bearing half a respectively and the projection 9 and recess 10 of each half mounting plate portion 8' of one bearing half a engaging the recess 10 and projection 9 of each half mounting plate portion 8' of the other bearing half a respectively to bring the half mounting plate portions 8' and 8' into contact with each other at the internal surfaces thereof so as to constitute a split bearing A comprising a bearing main portion 6 formed of the half bearing main portions 6' and 6' of the bearing halves a and a, a bearing hole 2 formed of the half bearing holes 2' and 2' thereof, mounting plates 8 and 8 each formed of the half mounting plate portions 8' and 8' thereof and mounting holes 5 each formed of the half mounting holes 5' and 5' thereof.

That is, a plurality of split bearing halves a having the same dimension and same shape are formed and a pair of the split bearing halves a and a are joined together to face each other into a split bearing A.

An Embodiment of a Split Bushing: FIGS. 7 to 10

An embodiment of a split bushing according to the present invention will be described with reference to drawings (FIGS. 7 to 10). A split bushing B according to the present invention is composed of a pair of bushing halves b and b each having a shape of semicylindrical body 11, i.e., a half of a cylindrical body split in the axial direction thereof, the cylindrical body slightly larger in internal diameter than the diameter of the shaft forming a bearing hole 2 therein, each semicylindrical body 11 being provided with a ridge 12 at one contact surface thereof and a groove 13 at the other contact surface thereof so that the semicylindrical bodies 11 are joined together to form the split bushing by engaging the ridge 12 and groove 13 of one semicylindrical body 11 with the groove 13 and ridge 12 of the other semicylindrical body 11 respectively. The split bushing B is fit in the split bearing A for rotatably supporting the shaft 1 inserted therethrough. Each bushing half of the same dimension and shape is formed of engineering plastics in a metal mold.

It is a matter of course that in case the split bushing B is fit in the split bearing A, the diameter of the bearing hole 2 should be previously conformed to the outer diameter the split bushing B.

As to the engineering plastics used as a material for the split bearing and split bushing according to the present invention, it is necessary to select one suited for bearing, being particularly excellent in mechanical strength, physical characteristics (lubricity, abrasion resistance etc.) and chemical characteristics such as chemical resistance (strong-acid resistance, strong-alkali resistance etc.).

In case a prior type bearing is already incorporated in a device, it has to be detached therefrom before attaching the split bearing A of the invention thereto. The prior type bearing has to be detached therefrom according to the conventional method as described above since there is no other way.

In case of attaching the split bearing A of the present invention to a device, bearing halves a and a are vertically or horizontally brought into contact with each other face to face in such a way that the half mounting holes 5' thereof receive the shaft 1 therein and the space 7, half bearing main portion 6', projection 9 and recess 10 of one bearing half a engage the half bearing main portion 6', space 7, recess 10 and projection 9 of the other respectively to join the bearing halves a and a together into the split bearing A and thereafter bolts 4 and 4 are inserted into mounting holes 5 and 5 (each being formed of half mounting holes 5' and 5') to be tightly screwed into the frame 3 or the like. Thus the attachment of the split bearing A is completed.

On the other hand, in case of detaching the split bearing A from the shaft 1 for exchange or other purpose, it can be easily detached from the device following the above processes in reverse order, i.e., detaching the bolts 4 and 4 and disjoining the bearing halves a and a.

In case of attaching the split bushing B of the present invention to a device, bushing halves b and b are vertically or horizontally brought into contact with each other to receive the shaft 1 therebetween so as to be incorporated into the split bushing B by engaging the ridge 12 and groove 13 of a bushing half b with the groove 13 and ridge 12 of the other bushing half b respectively and then the assembled split bushing B is fit in the split bearing A which has been previously mounted on a device, or the bearing halves a and a are fitted onto the split bushing B assembled as described above so as to be installed in the device. The split bushing B can be easily detached from the shaft by disengaging the ridges from the grooves to divide the split bushing B into bushing halves b and b.

Modified Embodiments of the Split Bearing: FIGS. 11 to 13

There are at present split bearings having three other shapes in front view according to the present invention other than that having a rhombic shape illustrated in FIG. 1(a), i.e., that having a flat octagonal shape $A_1$ illustrated in FIG. 11, that having a square shape $A_2$ illustrated in FIG. 12 and that having a circular shape $A_3$ illustrated in FIG. 13.

Methods of Using the Split Bearing

There are two methods of using the split bearing, i.e., fixing the same on the side surface of the frame 3 and embedding the same in a thick frame.

Figure 5:
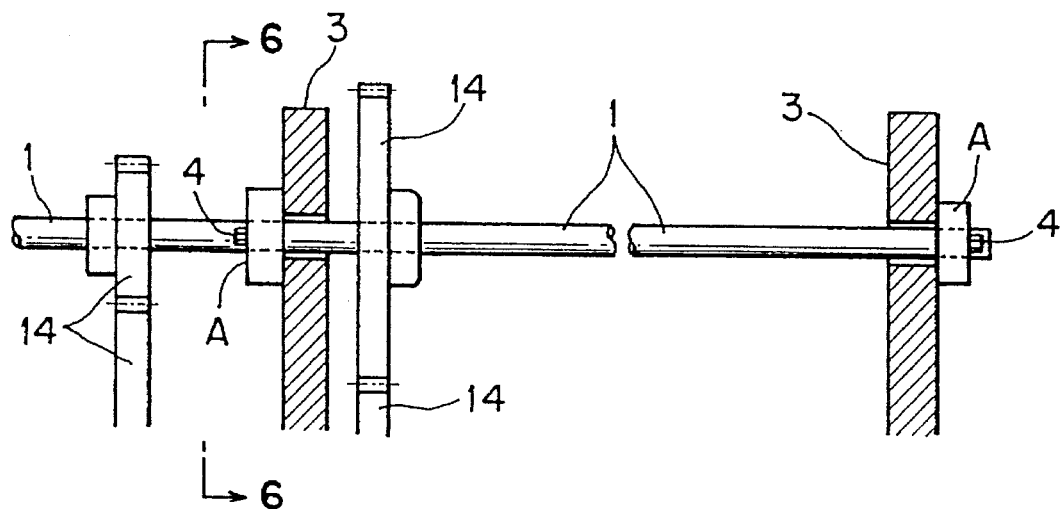
FIG. 5 is a view for explaining a state where the split bearing according to the embodiment of the present invention is attached to a portion of a device.
Figure 6:
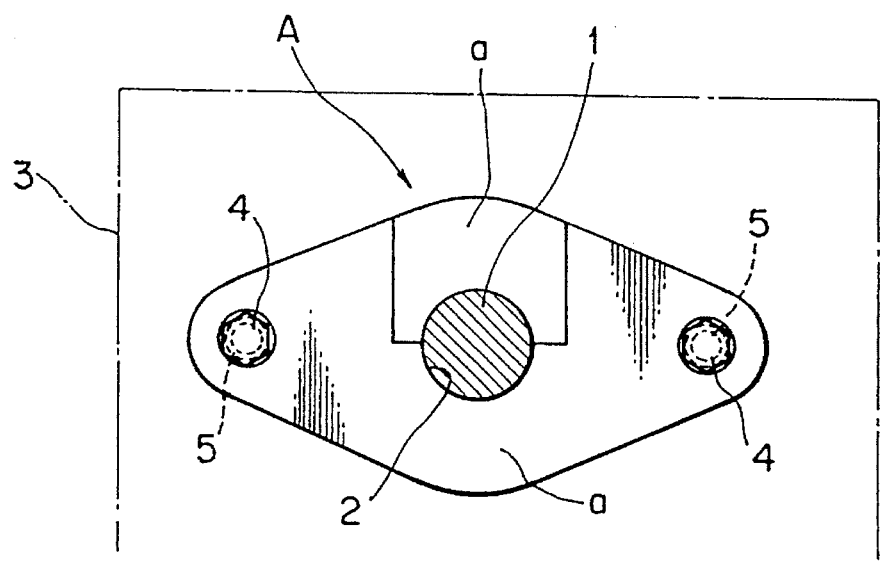
FIG. 6 is an enlarged cross-sectional view taken along an arrow 6—6 in FIG. 5.
Figure 9:
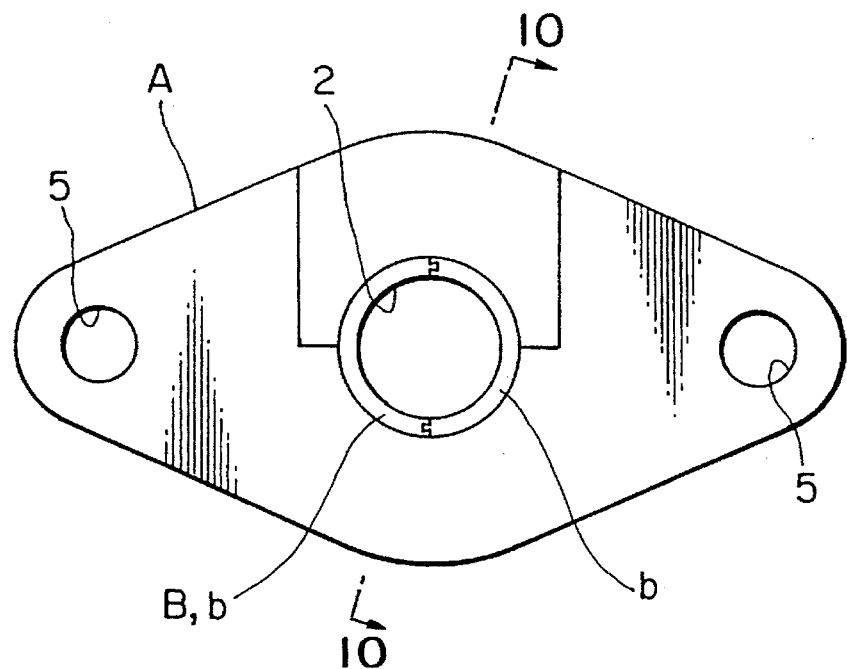
FIG. 9 is a front view of the split bushing attached to the split bearing according to the embodiment of the present invention.
Figure 10:
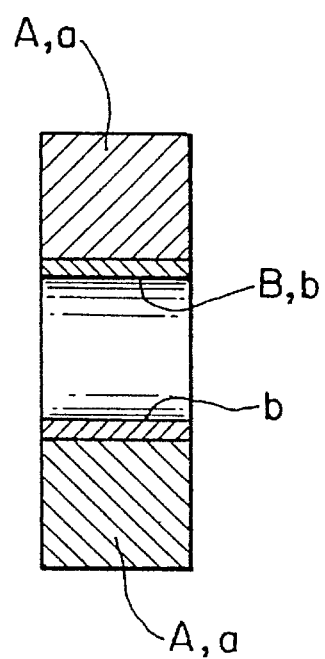
FIG. 10 is a cross-sectional view taken along a line 10—10 in FIG. 9.

(1) In case of fixing the split bearing on the side surface of the frame 3:

The split bearing having a rhombic shape illustrated in FIG. 1(a) is fixed to the frame 3 as illustrated in FIG. 5.

Split bearings according to modified embodiments are fixed to a frame 4 as illustrated in FIGS. 11(a) and 11(b), FIGS. 12(a) and 12(b) and FIGS. 13(a) and 13(b).

Figure 11A:
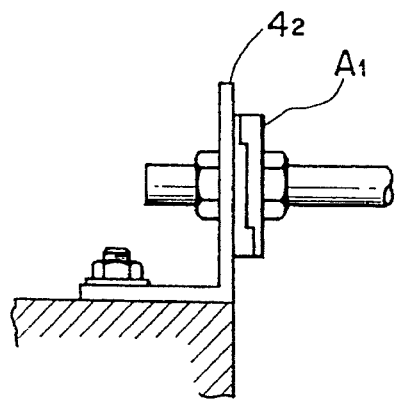
Figure 11B:
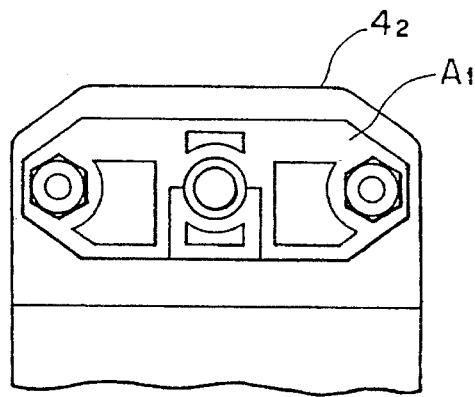
Figure 11C:
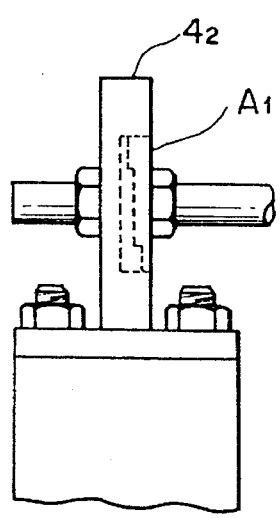
Figure 11D:
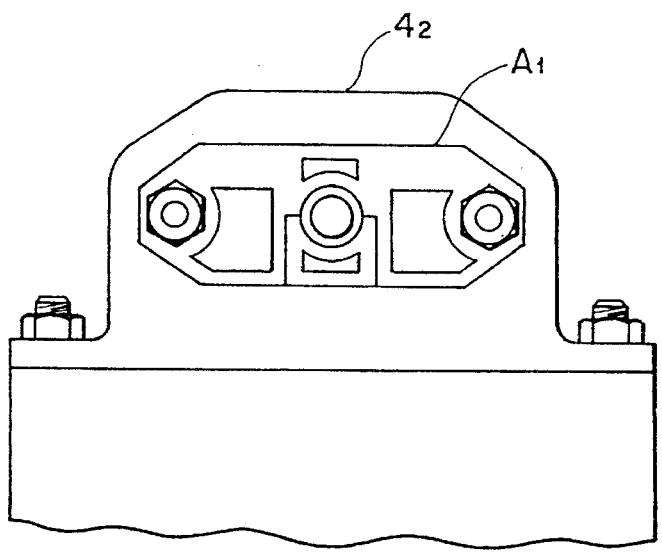

(2) In case of embedding the split bearing in a thick frame:

Although the method of embedding the split bearing having a rhombic shape illustrated in FIG. 1(a) in a thick frame is not shown, it is used in the same way as the split bearing illustrated in FIGS. 11(c) and 11(d).

The other split bearings according to the modified embodiments are used as illustrated in FIGS. 11(c) and 11(d), FIGS. 12(c) and 12(d) and FIGS. 13(c) and 13(d).

Figure 12A:
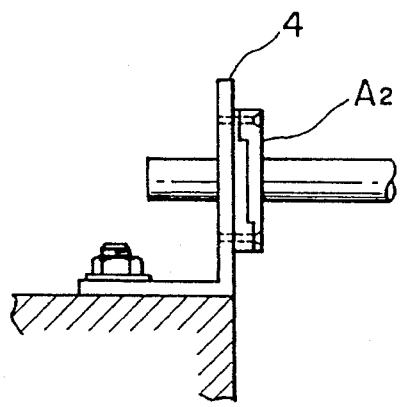
Figure 12B:
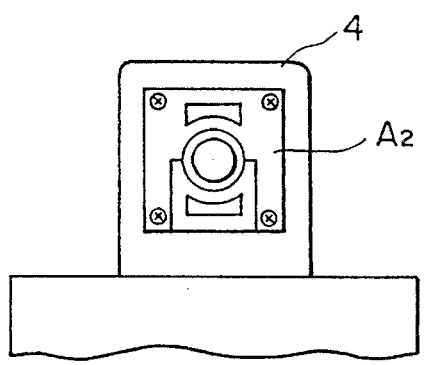
Figure 12C:
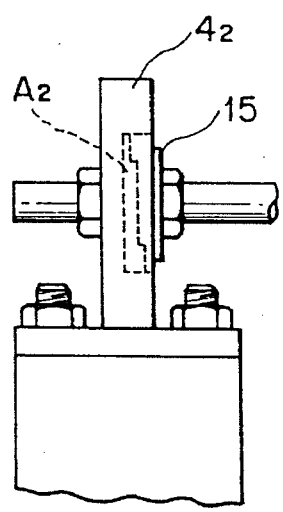
Figure 12D:
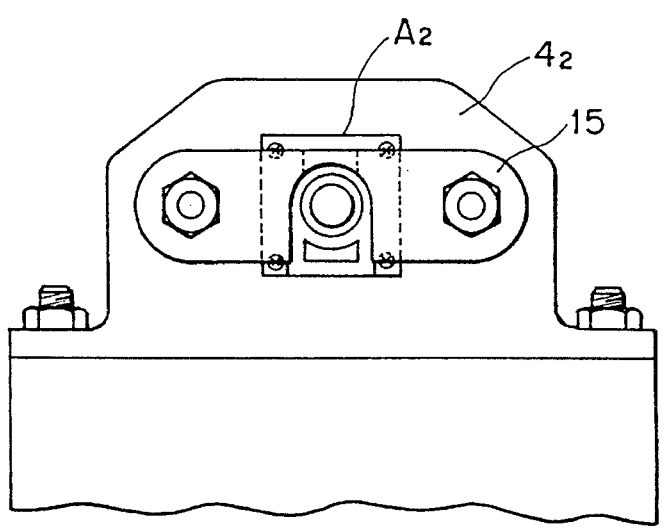
Figure 13A:
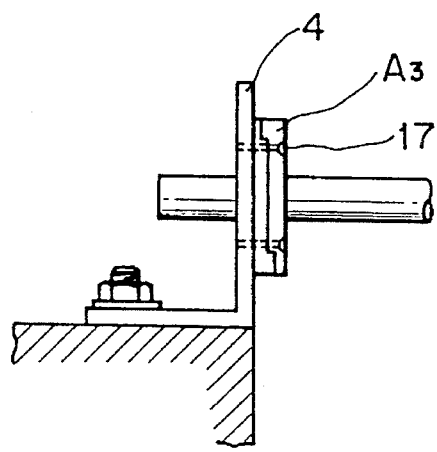
Figure 13B:
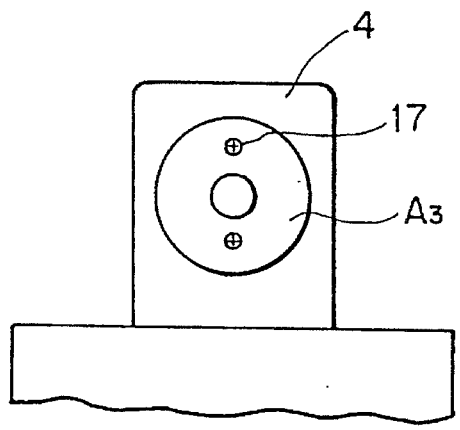
Figure 13C:
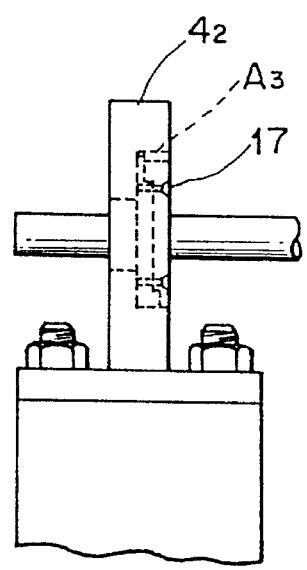
Figure 13D:
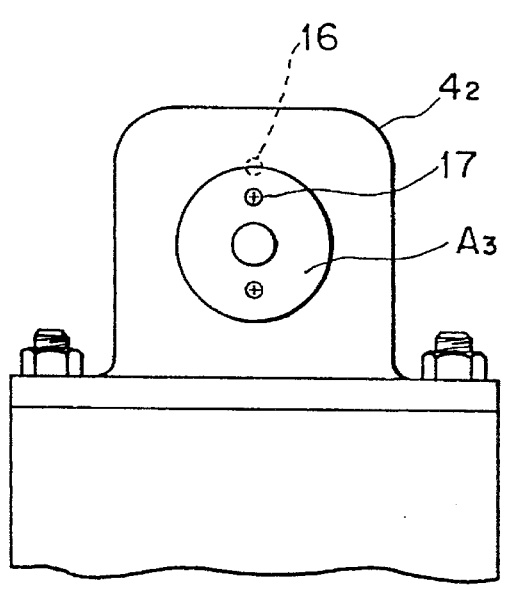

Moreover, the split bearing having a square shape illustrated in FIGS. 12(c) and 12(d) among those embedded in a thick frame is fixed thereto, for example, by a lock plate 15 to be held in position. The split bearing having a circular shape illustrated in FIGS. 13(c) and 13(d) is fixed to the thick frame by a lock pin 16 and set screws 17 to be held in position.

Since the split bearing and split bushing are made of engineering plastics according to the present invention, they have excellent characteristics such as rust and corrosion resistance against chemicals such as plating solution etc. or various ingredients of foods as well as excellent durability, and moreover, since they can be very easily assembled from upper and lower or left and right bearing or bushing halves, they can be attached to the shaft or exchanged with new ones very easily and effectively to the extent incomparable with prior ones.

Although the present invention does not use ball bearings at the bearing portion, the split bearing and split bushing of the present invention also have an advantage that even if the bearing portion is exposed to plating solution etc., which have been the worst factor of rusting and corrosion of ball bearings, quite contrariwise they serve as lubricating oil to smoothly rotate the shaft.

What is claimed is:

1. A split bearing provided with a bearing hole at a central portion thereof for rotatably supporting a shaft inserted therethrough in a front-to-back direction and mounting holes arranged at left and right positions symmetrical to each other relative to said bearing hole for inserting bolts therethrough to mount said split bearing on a frame, said split bearing comprising two bearing halves which are joined together into one piece to face each other, each said bearing half having a substantially box-shaped half bearing main portion which comprises a recess defining a half hole portion on a mating surface thereof, said half hole portion being a half of said bearing hole which is split in an axial direction thereof, and having a space which is the same in shape and size as said half bearing main portion, each said bearing half also having half mounting plate parts which are half of said half bearing main portion in thickness and extend to the left and right of said half bearing main portion, and which have mounting apertures arranged at left and right positions symmetrical to each other relative to a center of the bearing hole, each mounting aperture being a half of one said mounting hole in length, and each mounting plate part having an internal surface, an engaging projection on a first side of said internal surface thereof and an engaging recess on a second side of said internal surface thereof, said engaging projection and said engaging recess being antisymmetrical in shape relative to each other, wherein one of said two bearing halves and the other of said two bearing halves, which is rotated about the center of said bearing hole by 180°, are placed face to face to be joined together into one piece, said half bearing main portion and the space of the one bearing half fitting in the space and the half bearing main portion of the other bearing half respectively and the engaging projection and the engaging recess of each of the half mounting plate parts of the one bearing half engaging the engaging recess and the engaging projection of each of the half mounting plate parts of the other bearing half respectively with the opposing internal surfaces of said half mounting plate parts being in contact with each other so as to constitute a split bearing comprising a bearing main portion formed of said half bearing main portions of said bearing halves, the bearing hole formed of said half hole portions of said bearing halves, mounting plates each formed of said half mounting plate parts of said bearing halves which contact each other and mounting holes each formed of said mounting apertures of said bearing halves which are aligned in registry when said bearing halves are joined together.

2. A split bearing according to claim 1, wherein said split bearing has a shape of a rhombus, flat octagon, square, or circle in its front view.

3. A split bearing according to claim 1, wherein said split bearing is formed by joining a pair of bearing halves having the same dimension and shape into one piece to face each other.

4. The split bearing of claim 1, wherein a split bushing is disposed in said bearing hole around the shaft disposed through said bearing hole, said split bushing composed of a pair of bushing halves each having the shape of a semispherical body, each said bushing half being formed with a pair of opposed contact surfaces, a ridge formed along one contact surface thereof and being formed with a groove and the other contact surface thereof so that said bushing halves are joined together to form said split bushing by engaging said contact surfaces ridges into said grooves of said opposed contact surfaces.

5. A split bearing according to claim 1, wherein said bearing halves are formed of molded engineering plastics.

6. A split bearing according to claim 5, wherein said engineering plastics used as materials for said split bearing are suited for bearing, being particularly excellent in mechanical strength, physical characteristics.

* * * * *

UNITED STATES PATENT AND TRADEMARK OFFICE
CERTIFICATE OF CORRECTION

PATENT NO. : 5,505,546
DATED : April 9, 1996
INVENTOR(S) : Masashi Okude

It is certified that error appears in the above-indentified patent and that said Letters Patent is hereby corrected as shown below:

```
Column 8, line 45; after "characteristics" insert
                ---and chemical characteristics---.
```

Signed and Sealed this

Twenty-fifth Day of March, 1997

Attest:

BRUCE LEHMAN

Attesting Officer

Commissioner of Patents and Trademarks